United States Patent
Rahman et al.

(10) Patent No.: US 10,527,347 B2
(45) Date of Patent: Jan. 7, 2020

(54) METHODS AND APPARATUS FOR MECHANICAL SEPARATION OF $CO_2$

(71) Applicant: Petroliam Nasional Berhad (PETRONAS), Kuala Lumpur (MY)

(72) Inventors: Fadhli Hadana B Rahman, Kuala Lumpur (MY); Safwan Bin Ahmad Salam, Kuala Lumpur (MY); Mohd Adlan B Abdullah, Kuala Lumpur (MY); Mastura Bt Mohd, Kuala Lumpur (MY); Mohd Syazwan Bin Mohd Shukor, Kuala Lumpur (MY); Rahmah Bt Sulaiman, Kuala Lumpur (MY)

(73) Assignee: Petroliam Nasional Berhad (PETRONAS), Kuala Lumpur (MY)

( * ) Notice: Subject to any disclaimer, the term of this patent is extended or adjusted under 35 U.S.C. 154(b) by 162 days.

(21) Appl. No.: 15/513,403

(22) PCT Filed: Oct. 23, 2015

(86) PCT No.: PCT/MY2015/050134
§ 371 (c)(1),
(2) Date: Mar. 22, 2017

(87) PCT Pub. No.: WO2016/064265
PCT Pub. Date: Apr. 28, 2016

(65) Prior Publication Data
US 2018/0023891 A1 Jan. 25, 2018

(30) Foreign Application Priority Data
Oct. 23, 2014 (MY) .............................. PI2014003011

(51) Int. Cl.
*F25J 3/06* (2006.01)
*B01D 45/14* (2006.01)
(Continued)

(52) U.S. Cl.
CPC .............. *F25J 3/067* (2013.01); *B01D 45/14* (2013.01); *B01D 53/002* (2013.01); *F25J 3/061* (2013.01);
(Continued)

(58) Field of Classification Search
CPC .. F25J 3/067; F25J 3/0635; F25J 3/061; F25J 3/0209; F25J 3/08; F25J 3/069;
(Continued)

(56) References Cited

U.S. PATENT DOCUMENTS

| | | | |
|---|---|---|---|
| 4,113,452 A | 9/1978 | Brown et al. | |
| 4,171,964 A * | 10/1979 | Campbell | F25J 3/0209 62/621 |

(Continued)

FOREIGN PATENT DOCUMENTS

| | | |
|---|---|---|
| DE | 10151665 A1 | 5/2002 |
| EP | 2413035 A2 | 2/2012 |

(Continued)

OTHER PUBLICATIONS

Al-Motin, Abdulla, "International Search Report" for PCT/MY2015/050134, dated Feb. 16, 2016, 6 pages.

*Primary Examiner* — Emmanuel E Duke
(74) *Attorney, Agent, or Firm* — Winstead PC

(57) ABSTRACT

A method for the separation of liquid $CO_2$ from a 2 phase feed stream, the process comprising the steps of: cooling the feed stream to a cryogenic temperature; expanding the cooled stream so as to further lower the temperature of the feed through expansion; mechanically separating the expanded stream, using a mechanical separator, into a gas phase and a liquid $CO_2$ phase, and; venting the gas phase and outflowing the liquid $CO_2$.

12 Claims, 7 Drawing Sheets

(51) Int. Cl.
*B01D 53/00* (2006.01)
*C10L 3/10* (2006.01)

(52) U.S. Cl.
CPC ......... *F25J 3/0635* (2013.01); *B01D 2256/24* (2013.01); *B01D 2257/504* (2013.01); *C10L 3/104* (2013.01); *F25J 2205/10* (2013.01); *F25J 2215/04* (2013.01); *F25J 2215/80* (2013.01); *F25J 2220/82* (2013.01); *F25J 2245/02* (2013.01); *F25J 2290/72* (2013.01); *Y02C 10/04* (2013.01); *Y02C 10/12* (2013.01)

(58) Field of Classification Search
CPC ........ F25J 3/066; F25J 3/0223; F25J 2215/80; F25J 2245/02; F25J 2205/10; F25J 2215/04; F25J 2220/82; F25J 2290/72; B01D 53/002; B01D 45/14; B01D 53/1475; B01D 2256/24; C10L 3/104; C07C 7/005; Y02C 10/12
See application file for complete search history.

(56) References Cited

U.S. PATENT DOCUMENTS

| | | | |
|---|---|---|---|
| 5,442,924 A * | 8/1995 | Tsai | C10L 3/10 62/611 |
| 6,869,469 B2 | 3/2005 | Grover et al. | |
| 2012/0023947 A1* | 2/2012 | Kulkarni | B01D 53/002 60/693 |
| 2013/0118205 A1* | 5/2013 | Forsyth | F04D 29/582 62/617 |
| 2013/0192296 A1 | 8/2013 | Betting et al. | |
| 2013/0255486 A1* | 10/2013 | Hall | B01D 53/24 95/34 |
| 2014/0053761 A1* | 2/2014 | Galasso | C01B 32/50 110/345 |

FOREIGN PATENT DOCUMENTS

| EP | 2789957 A1 | 10/2014 | |
|---|---|---|---|
| KR | 20090035887 A * | 4/2009 | ........... F25B 41/003 |

* cited by examiner

METHODS AND APPARATUS FOR MECHANICAL SEPARATION OF $CO_2$

FIELD OF THE INVENTION

The present disclosure relates to the separation of $CO_2$ from a feed stream of, for instance, hydrocarbon gas.

BACKGROUND

Cryogenic separation is a process that separates CO2 under extremely low temperature. It enables direct production of liquid CO2 at a low pressure, so that the liquid CO2 can be stored or sequestered via liquid pumping instead of compression of gaseous CO2 to a very high pressure, thereby saving on compression energy.

However, cryogenic distillation technology for high concentration of CO2 feed mixture and at offshore condition poses a challenge in terms of its economic and space limitation.

It would therefore he advantageous to provide an alternative method of cryogenic separation that provides a space benefit over the prior system.

SUMMARY OF INVENTION

In a first aspect the invention provides a method for the separation of liquid $CO_2$ from a 2 phase feed stream, the process comprising the steps of: cooling the feed stream to a cryogenic temperature; expanding the cooled stream so as to further lower the temperature of the feed through expansion; mechanically separating the expanded stream, using a mechanical separator, into a gas phase and a liquid $CO_2$ phase, and; venting the gas phase and outflowing the liquid $CO_2$.

In a second aspect the invention provides a mechanical separator for separating liquid CO2 from a 2 phase feed stream, comprising: a housing defining an enclosed chamber within the housing, said chamber arranged to receive the 2 phase feed stream; a baffle within the chamber, said baffle arranged to rotate relative to the housing and positioned such that the feed stream is received at a central portion of said baffle; said housing including a liquid phase outlet proximate to a periphery of the chamber and a gas phase outlet proximate to a central portion of the baffle; wherein rotation of the baffle is arranged to accelerate a liquid phase of the 2 phase feed stream to the periphery of the chamber for outflowing through the liquid phase outlet with the gas phase at said central portion for venting through the gas phase outlet.

Accordingly, the use of a mechanical separation system for the cryogenic separation of CO2 from a hydrocarbon gas feed stream achieves the desired separation results, without the space requirement conventional distillation columns introduce.

BRIEF DESCRIPTION OF DRAWINGS

It will be convenient to further describe the present invention with respect to the accompanying drawings that illustrate possible arrangements or the invention. Other arrangements of the invention are possible and consequently, the particularity of the accompanying drawings is not to be understood as superseding the generality of the preceding description of the invention.

DETAILED DESCRIPTION

The following description represents actual trials, providing experimentally measured data, and is not intended to limit the invention to a particular range of values and outcomes. The invention is therefore explained with reference to the specific nature of the experimental results, but not to any particular arrangement that may limit its scope.

It will therefore be apparent to the skilled person that different applications of the invention as described may yield different numerical results from those given below and still fall within the scope of the invention.

Figure 1:
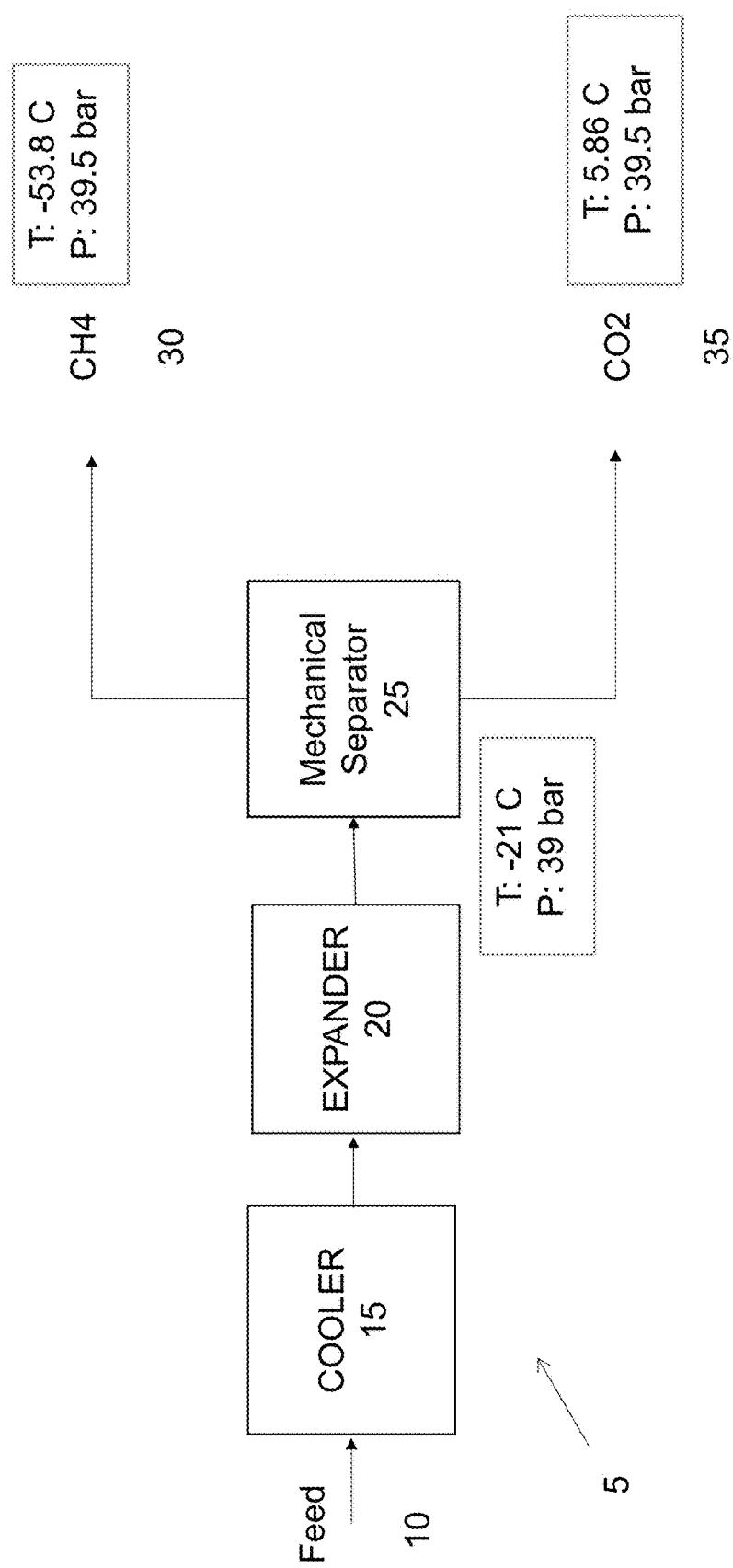
FIG. 1 is a flow diagram of one embodiment of a process according to the present invention.
Figure 2:
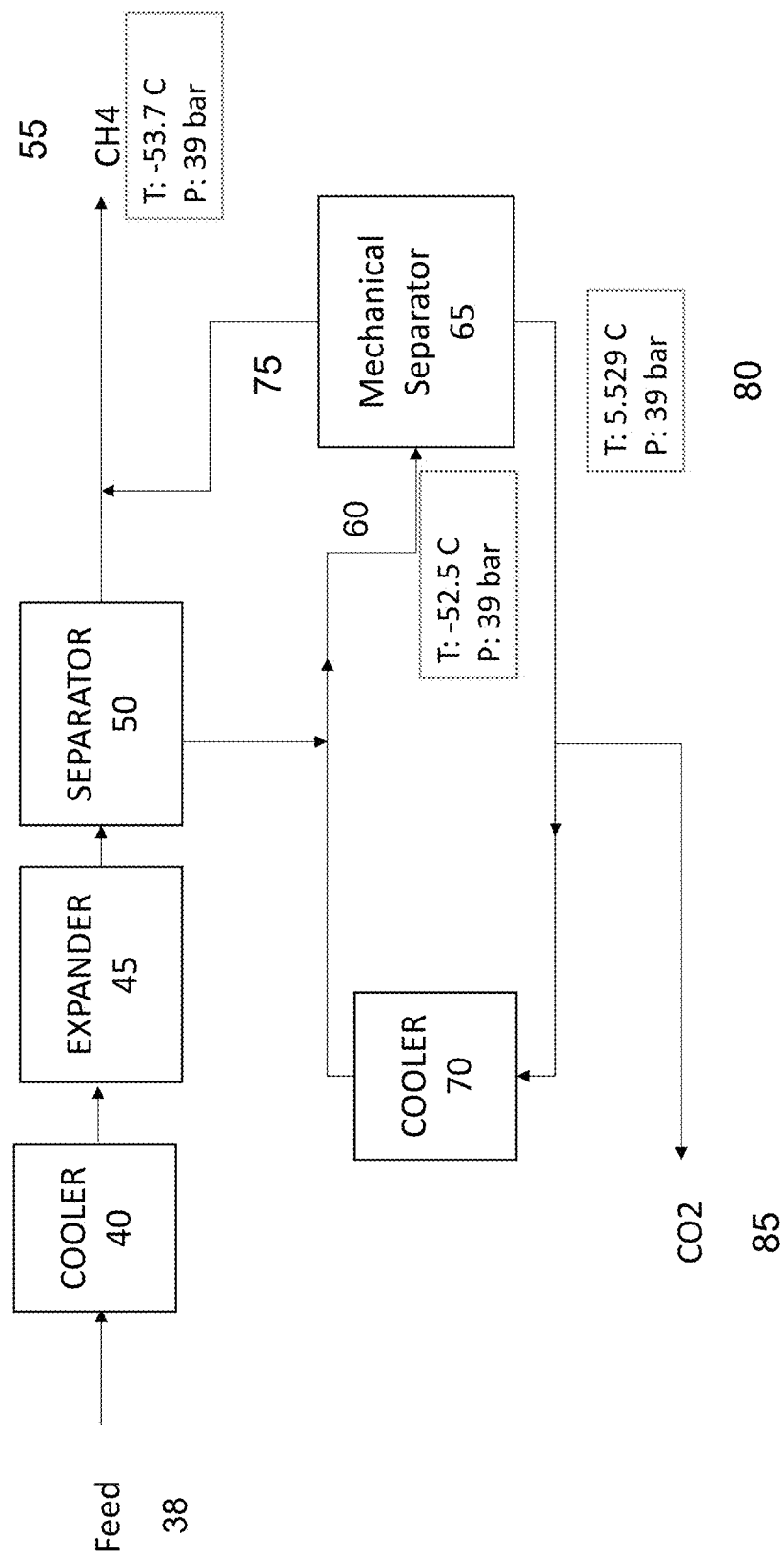
FIG. 2 is a flow diagram of a further embodiment according to the present invention.
Figure 3:
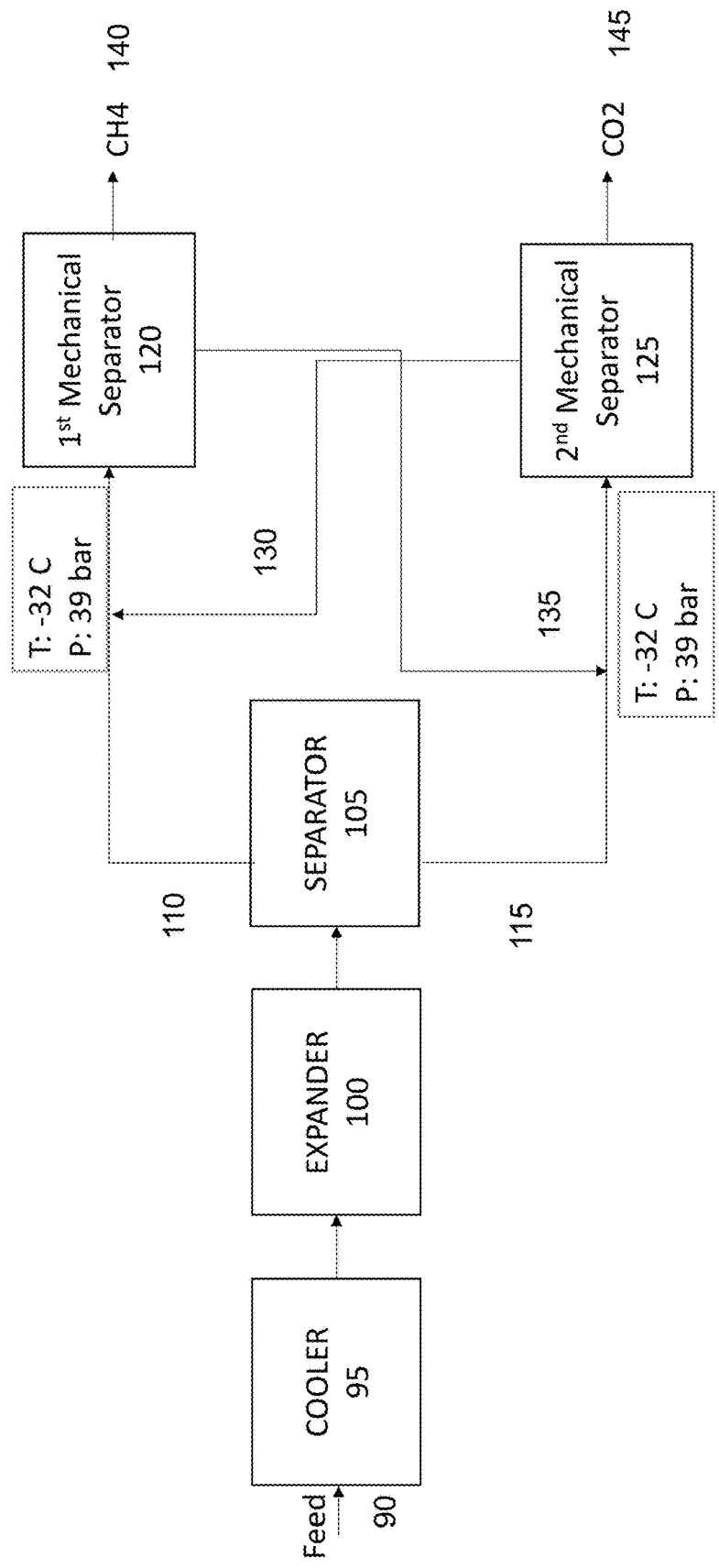
FIG. 3 is a flow diagram of a still further embodiment according to the present invention.

Thus, FIGS. 1 to 3 show three different and general embodiments of the present invention. These arrangements were tested and measure to provide specific results having very precise outcomes. Providing specific experimental results is intended to explain the general operation of the invention through use of particular information. FIG. 1 shows one embodiment of the present invention being a cryogenic separation system 5 whereby a hydrocarbon feed stream 10 is fed into a heat exchanger or cooler 15 in order to cool the feed stream. The cool feed stream is then passed into an expander 20 which, on expansion, further cools the two phase stream. Consequently, the feed stream is at −21 C. at a pressure of 39 bar as it enters the mechanical separator 25. The two phase feed stream then undergoes a mechanical separation so as to separate a gas phase and liquid CO2 30 at a temperature of −53.8° at a pressure of 39.5 bar and then outflow a liquid CO2 stream at 5.86 C. at 39.5 bar.

The use of a mechanical separator such as that shown in FIG. 1 avoids the use of conventional distillation columns which require significantly more space and the consequential infrastructure costs which is inherently associated with such equipment. While an important consideration on land, for offshore applications, the use of a mechanical separator provides a significant advantage economically and potentially the difference between a viable application for cryogenic separation or not.

FIG. 2 shows a further embodiment whereby the feed stream 38 passes through a similar heat exchanger 40 and expander stage 45 before passing through a conventional separator 50. Because the feed stream will eventually undergo mechanical separation the separator 50 does not need to provide a full separation but merely increase the overall efficiency of the system when used in association with the mechanical separator 65. To this end, the separator 50 vents the gas stream 55 and passes the liquid phase 60 to the mechanical separator 65.

In the embodiment of FIG. 2 a further re-cooling phase 70 is provided to again aid in the efficiency of the cryogenic separation. Here the liquid phase is alternatively outflowed 85 or may pass through the heat exchanger 70 to introduce a re-cool feed stream to the mechanical separator 65. Throughout the process, the gas phase is vented 75 as part of the two phase separation.

As shown in FIG. 3, the feed gas 90 is cooled down to a temperature of −20 C. from 32.51 C. via a heat exchanger 95. The cooled gas is further cool down to −32 C. via expansion 100 of the gas from 73 bar to 40 bar. After the expansion 100, phase change occurs changing the stream to have gas and liquid at ratio of 0.3. Further downstream the gas is enters a separator 105 to separate the liquid and gas in the stream. The top outlet 110 of the separator vessel shall contain 38 mol % of CO2 and 52 mol % of CH4 . While the bottom outlet of the separator vessel contain 84 mol % of CO2 and 13 mol % of CH4.

The top outlet 110 of the separator 105 is mixed with the top product 130 of the $2^{nd}$ mechanical separator 125 forming a composition of 39.38 mol % of CO2 and 53.63 mol % of CH4. This will then enter the $1^{st}$ mechanical separator 120 as a feed stream at temperature −32 C. and pressure of 39 bar.

The bottom outlet 115 of the separator 105 is mixed with the bottom product 135 of the 1st mechanical separator 120 forming a composition 84.7 mol % of CO2 and 12.58 mol % of CH4 . This is then directed into the 2nd mechanical separator 125 as a feed stream at temperature −32 C. and pressure of 39 bar.

The stream 130 from the $2^{nd}$ mechanical separator 125 enters as gas feed to the $1^{st}$ mechanical separator 120. The gas feed is fed into the 1st mechanical separator 120 via a gas inlet located at the side wall. The gas will undergo heat and mass transfer by contacting with the counter and cross flow of liquid flowing from the centre of the mechanical separator.

The intense and rigorous gas contact with the liquid within the $1^{st}$ mechanical separator 120 will separate CO2 components from the gas into the liquid. Accordingly, the top outlet of 140 from the $1^{st}$ mechanical separator 120 is rich in CH4 and the bottom outlet 133 rich in CO2.

The top outlet stream 140 which is 100% in gas form will be subjected to a condenser to be cool down to a temperature −53 C. This will change the single gas phase into liquid and gas phase. The liquid may return to the mechanical separators 120, 125 as a reflux stream. The gas vented from the $1^{st}$ mechanical separator may have a composition of 20.55 mol % of CO2 and 70.4 mol % of CH4. The bottom outlet of the $1^{st}$ mechanical separator 120 will have 85.4 mol % of CO2 and 12.4 mol % of CH4.

Within the $2^{nd}$ mechanical separator 125, the stream 115 enters the $2^{nd}$ mechanical separator as liquid feed. The liquid feed inlet of $2^{nd}$ mechanical separator is at the top and centre. The liquid feed will undergo mass and heat transfer by counter and cross flow contacting with the incoming flow of gas. Here, most of the CH4 trapped within the liquid feed will be stripped out and forming a vapour high in CH4. The stripped gas will move to the gas outlet 130 located at the centre of the $2^{nd}$ mechanical separator 125. The gas outlet stream of $2^{nd}$ mechanical separator contains 55 mol % of CH4 and 40 mol % of CO2.

The liquid outlet at the bottom of $2^{nd}$ mechanical separator 125 may be subjected to heat in a re-boiler to increase the temperature to 4.2 C, and so forming a stream with both liquid and gas phase.

The gas phase will re-enter the mechanical separator at a re-boil ratio of 0.52. Meanwhile the liquid will form the bottom product of $2^{nd}$ mechanical separator 125 and will contain up to 97 mol % of CO2.

FIGS. 4 to 7 show various embodiments of a mechanical separator according to the present invention.

Figure 4:
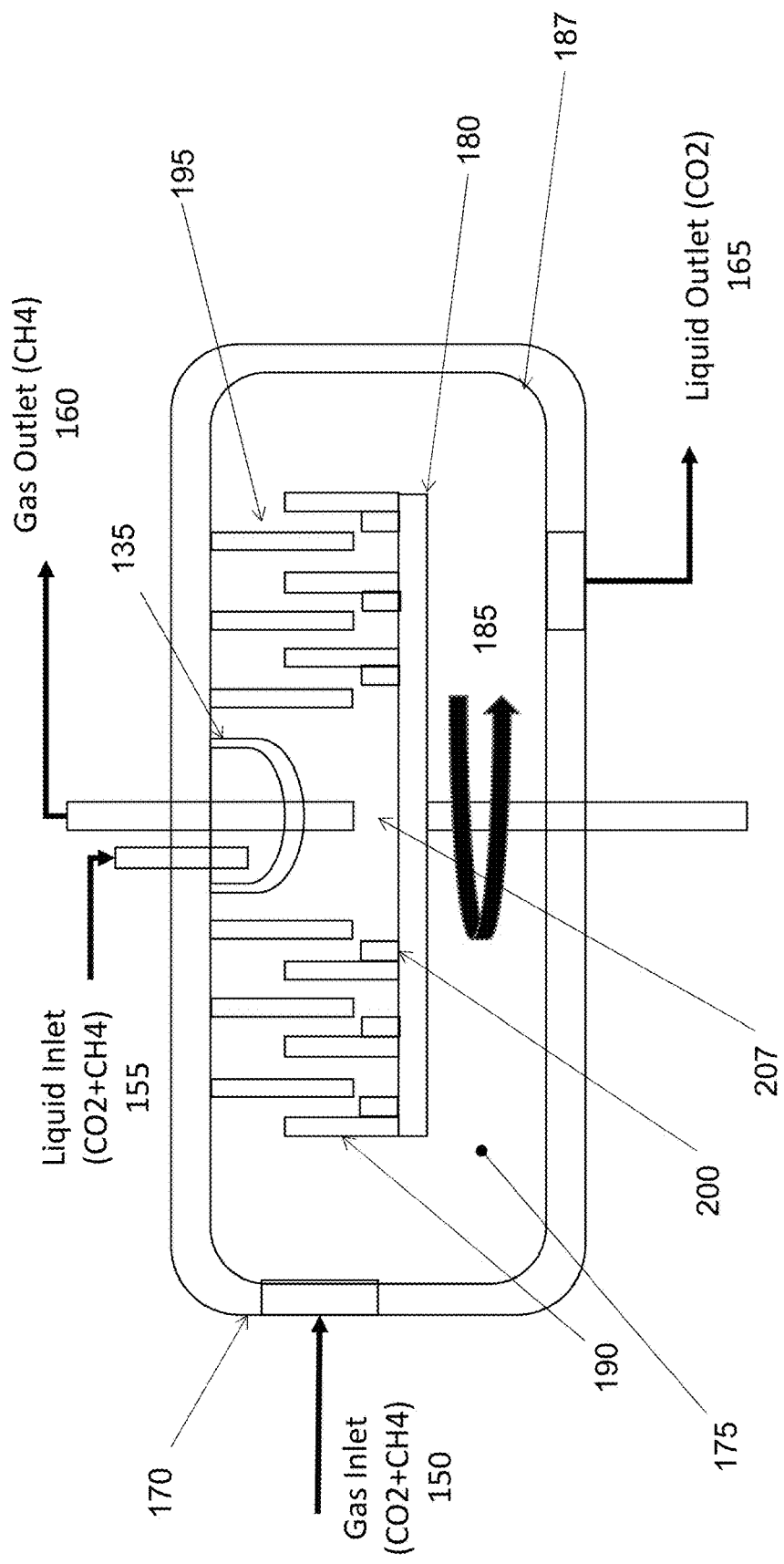
FIG. 4 is a cross-section view of a mechanical separator according to one embodiment of the present invention.

The mechanical separator as shown in FIG. 4 is one embodiment of the mechanical separation envisaged by the present invention. In this embodiment both liquid 155 and gas 150 inlets provide the feed stream into the mechanical separator. The mechanical separator includes a housing 170 defining an internal cavity 175 being the separation chamber. A baffle arranged to rotate 185 includes a baffle plate 180 having a plurality of members 190 projecting therefrom. The housing includes a plurality of elements 195 projecting from an internal surface so as to, in this embodiment, intermeshed with the members of the rotating baffle.

This embodiment further includes a mass transfer device 200 for aiding in the formation of bubbles in the liquid phase so as to facilitate heat and mass transfer. By rotating the baffle, as liquid is introduced through the liquid distributor 135, the liquid distributor 135 uniformly distributes the liquid as droplets again to aid in heat and mass transfer by increasing surface area. The liquid phase is further disrupted by the interaction between the stationary elements 195 and moving members 190. The centrifugal force applied by the rotating baffle forces the liquid through the interlaced elements and members to a periphery of the chamber 175 whereby the liquid phase is eventually passed through a liquid outlet 165.

The gas within the feed stream, however, is subject to a vortex arrangement and so biased into the central portion 207 of the rotating baffle whereupon it is vented through the gas outlet 160.

Figure 5:
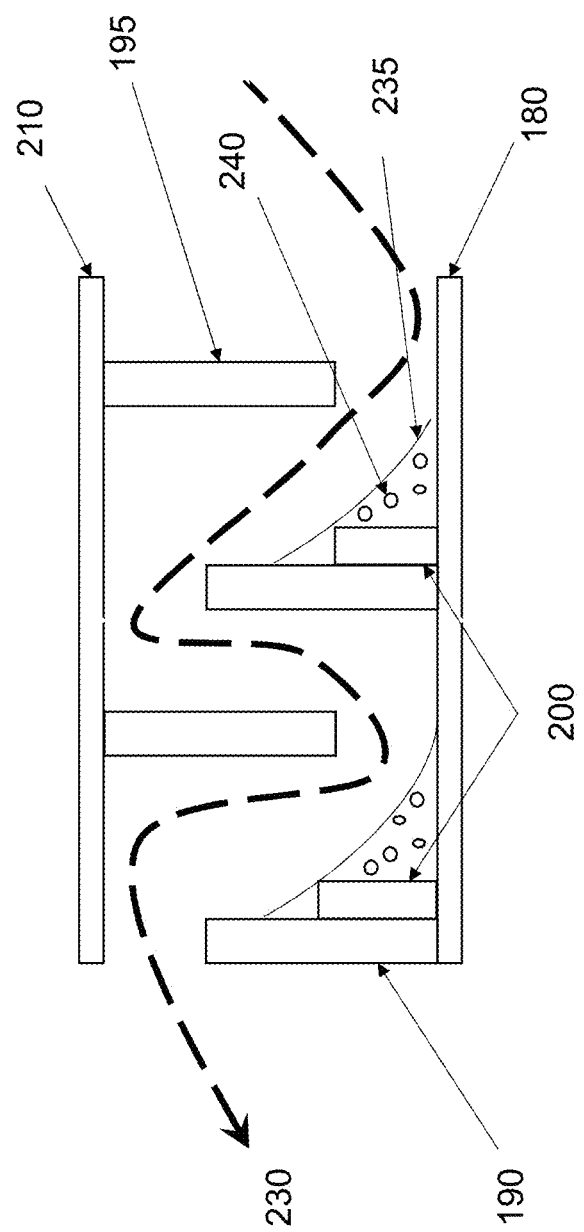
FIG. 5 is a detailed view of a portion of the mechanical separator of FIG. 4

FIG. 5 shows a detailed view of the liquid phase path as it passes through the interlaced stationary elements 195 and moving members 190 of the rotating baffle. The mass transfer device 200 further impedes the liquid phase flow 230 tending to collect liquid 235 and forming bubbles 240 as a result of the consequential turbulence. In this way the mass transfer devices aid in the heat and mass transfer to further boil the liquid as it passes from the central portion to the periphery of the chamber.

Figure 7:
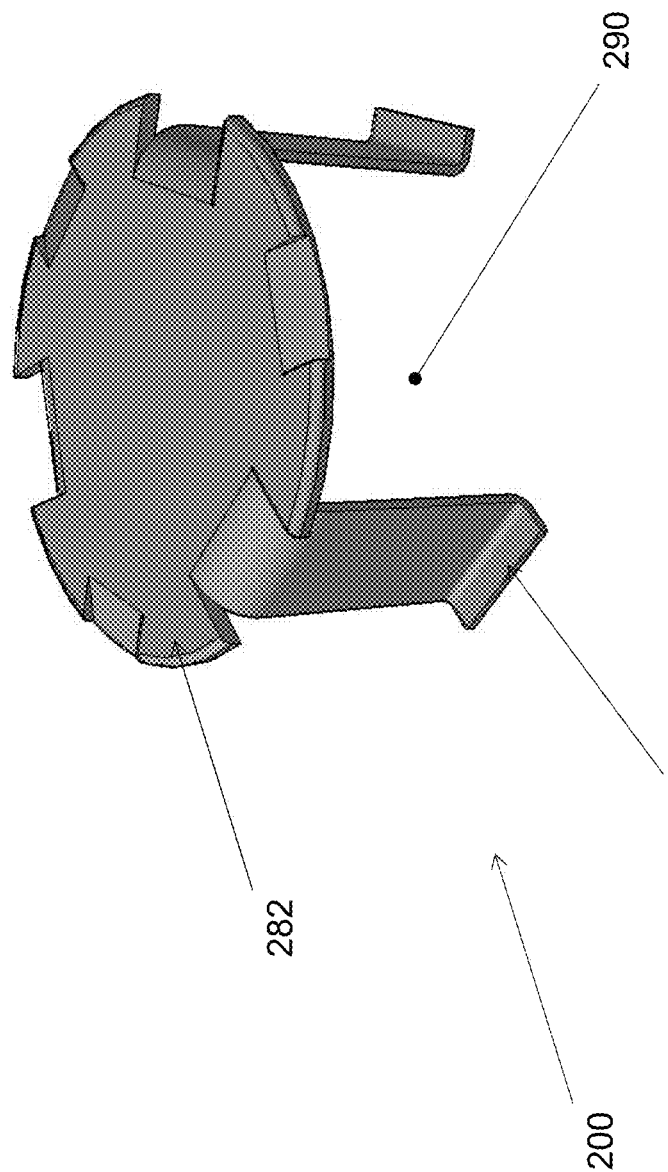
FIG. 7 is an isometric view of a mass transfer device of the rotating baffle according to one embodiment of the present invention

As shown in FIGS. 5 and 7, under centrifugal condition due to rotation of rotating baffle, a vortex of liquid will form. Most of this liquid 240 will be pushed to the peripheral wall 187 and gases are being forced to be pushed into the centre of the mechanical separator due to its density difference, and so leaving a space of gas zone in the centre top of the mechanical separator. Thus, introduction of liquid droplets within this zone enhances mass and heat transfer significantly. Under this centrifugal effect the gas will be driven towards the centre of the mechanical separator and channels out through the gas outlet tube. The application of this liquid distributor enhances the performance overall in terms of separation efficiency and having a shorter residence time.

In one embodiment, the mass transfer device may be in the form of a bubble cap 200. The gas forms bubbles 240 by penetrating through the bubble cap 200. The bubbles formed from the bubble cap enhance mass and heat transfer due to its increase in surface area.

Bubble cap 200 includes a small metal disk 282. The small metal disk 282 is round in shape, supported with risers 285 and is not movable. Bubble caps are placed horizontally on the openings of the surface of rotating baffles inside the mechanical separator. Only half surface of the rotating baffles are installed with bubble cap in order for the bubble cap to be submerged in the liquid layer. The gas will undergo heat and mass transfer by contacting with the counter and cross flow of liquid from the centre of the mechanical separator. The gas flow will split and forms bubbles when penetrating through 290 the bubble cap.

Figure 6:
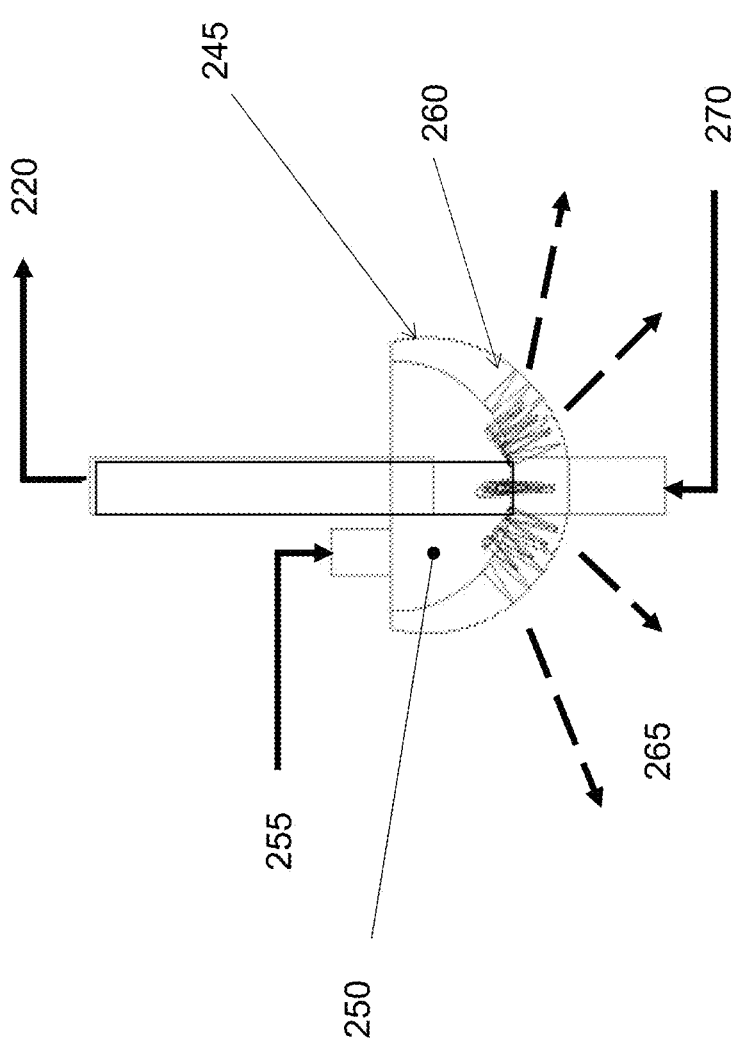
FIG. 6 is a detailed view of a further portion of the mechanical separator of FIG. 4

FIG. 6 shows a liquid distributor 245 according to one embodiment of the present invention. The purpose of this liquid distributor 245 is to generate fine droplets of liquids 265 and distribute it into the gas vapour zone at the central portion of the baffle plate of the mechanical separator. This liquid distributor includes of a liquid inlet 255, hemispherical liquid chamber 250, cone shaped nozzles 260 and a gas outlet tube 220, 270.

During operation of mechanical separator, the liquid feed inlet 255 is fed into the mechanical separator through the liquid distributor 245. The liquid inlet 255 flows the high pressure liquid feed into the hemispherical chamber 250. The liquid feed then will enter the centre of the mechanical separator through the cone shaped nozzles 260 embedded within the semi sphere liquid chamber. Due to high pressure of liquid and cone shaped nozzles, the liquid feed is choked and expanded immediately when it reaches the central portion of the mechanical separator forming a spray effect of fine droplets of liquid. These fine droplets of liquid enhance the mass and heat transfer of the rotating gas in the centre of the mechanical separator.

The invention claimed is:

1. A method for the separation of liquid $CO_2$ from a 2 phase feed stream, the method comprising the steps of:
    cooling the feed stream in a cooler to a cryogenic temperature;
    expanding the cooled stream so as to further lower the temperature of the feed through expansion;
    mechanically separating the expanded stream, using a mechanical separator, into a gas phase and a liquid $CO_2$ phase;
    venting the gas phase and outflowing the liquid $CO_2$; and
    a separator intermediate the expanding step and the mechanical separating step, said separating step including venting a gas stream from the separator and outflowing a liquid stream to the mechanical separator.

2. The method according to claim 1, further including a re-cooling step simultaneously with the mechanical separating step, wherein the re-cooling step includes passing an outflow of liquid CO2 from the mechanical separator through a re-cooling stage and inflowing the re-cooled liquid phase back through the mechanical separator.

3. The method according to claim 1, wherein venting of the gas stream from the separator is to a first mechanical separator and outflowing of the liquid stream is to a second mechanical separator.

4. The method according to claim 3, including the steps of the first mechanical separator venting a gas stream, and outflowing a liquid stream to the second mechanical separator.

5. The method according to claim 3, including the steps of the second mechanical separator outflowing a liquid CO2 stream, and venting a gas stream to the first mechanical separator.

6. A mechanical separator for separating liquid CO2 from a 2 phase feed stream, comprising:
    a housing defining an enclosed chamber within the housing, said chamber arranged to receive the 2 phase feed stream;
    a baffle within the chamber, said baffle arranged to rotate relative to the housing and positioned such that the feed stream is received at a central portion of said baffle;
    said housing including a liquid phase outlet proximate to a periphery of the chamber and a gas phase outlet proximate to a central portion of the baffle; and
    wherein rotation of the baffle is arranged to accelerate a liquid phase of the 2 phase feed stream to the periphery of the chamber for outflowing through the liquid phase outlet with the gas phase at said central portion for venting through the gas phase outlet.

7. The mechanical separator according to claim 6, further including a liquid distributor at the central portion into which the 2 phase feed stream is received;
    said liquid distributor having a plurality of apertures arranged to distribute and direct the feed stream in a uniform manner about the chamber.

8. The mechanical separator according to claim 7, wherein the liquid distributor is hemispherical and said nozzles are cone shaped and projecting into the chamber.

9. The mechanical separator according to claim 6, wherein:
    the baffle includes a plate having a planar surface perpendicular to the axis of rotation of the baffle;
    said plate including a plurality of members projecting from said plate.

10. The mechanical separator according to claim 9, wherein the housing includes a plurality of elements projecting from an internal surface of the housing, said elements projecting into a flow path of the liquid phase stream intermediate central portion and the periphery.

11. The mechanical separator according to claim 9, wherein the plurality of members and the plurality of elements are positioned so as to interlace during rotation of the baffle.

12. The mechanical separator according to claim 9, further including a plurality of valve caps positioned on said plate so as to impede the flow path of the liquid phase stream, said impedance arranged to form bubbles within said liquid phase stream.

* * * * *